United States Patent [19]

Plangger et al.

[11] Patent Number: 4,812,602
[45] Date of Patent: Mar. 14, 1989

[54] SPRING-LOADED CENTRIFUGAL SWITCH ELEMENT

[75] Inventors: Rico Plangger, Turgi; Kamil Prochazka, Windisch, both of Switzerland

[73] Assignee: BBC Brown Boveri AG, Baden, Switzerland

[21] Appl. No.: 181,378
[22] Filed: Apr. 14, 1988
[30] Foreign Application Priority Data
Apr. 21, 1987 [DE] Fed. Rep. of Germany ....... 3713353
[51] Int. Cl.$^4$ ............................................. H01H 35/10
[52] U.S. Cl. ...................................... 200/80 R; 74/3; 307/120
[58] Field of Search ............................ 74/3; 200/80 R; 310/68 E; 73/535, 537, 540, 542, 549; 318/462, 793; 307/120

[56] References Cited

U.S. PATENT DOCUMENTS

| 4,040,301 | 8/1977 | Rognon | 74/3 |
| 4,516,045 | 5/1985 | Borst | 200/80 R |
| 4,689,452 | 8/1987 | Quick | 200/80 R |

FOREIGN PATENT DOCUMENTS

| 1049392 | 1/1959 | Fed. Rep. of Germany. |
| 1133632 | 7/1962 | Fed. Rep. of Germany. |
| 1116450 | 7/1967 | Fed. Rep. of Germany. |
| 3233038 | 4/1983 | Fed. Rep. of Germany. |
| 3232856 | 4/1983 | Fed. Rep. of Germany. |

Primary Examiner—Gerald P. Tolin
Attorney, Agent, or Firm—Burns, Doane, Swecker & Mathis

[57] ABSTRACT

The switch element for triggering a cut off or control function is accommodated in a shaft (1), for example of a speed monitor. A spring-loaded release bolt (2) is surrounded coaxially by a compensating bush (4) which has a compensating ring (15), a spring plate (13) and a hub tube (14) and the center of gravity ($S_{Kb}$) is such that, when the shaft (1) rotates, it compensates the centrifugal force, acting as an additional force to the spring prestressing force, of the spring half adjacent to the spring plate (13) and having the center of gravity ($S_{F/2}$).

3 Claims, 1 Drawing Sheet

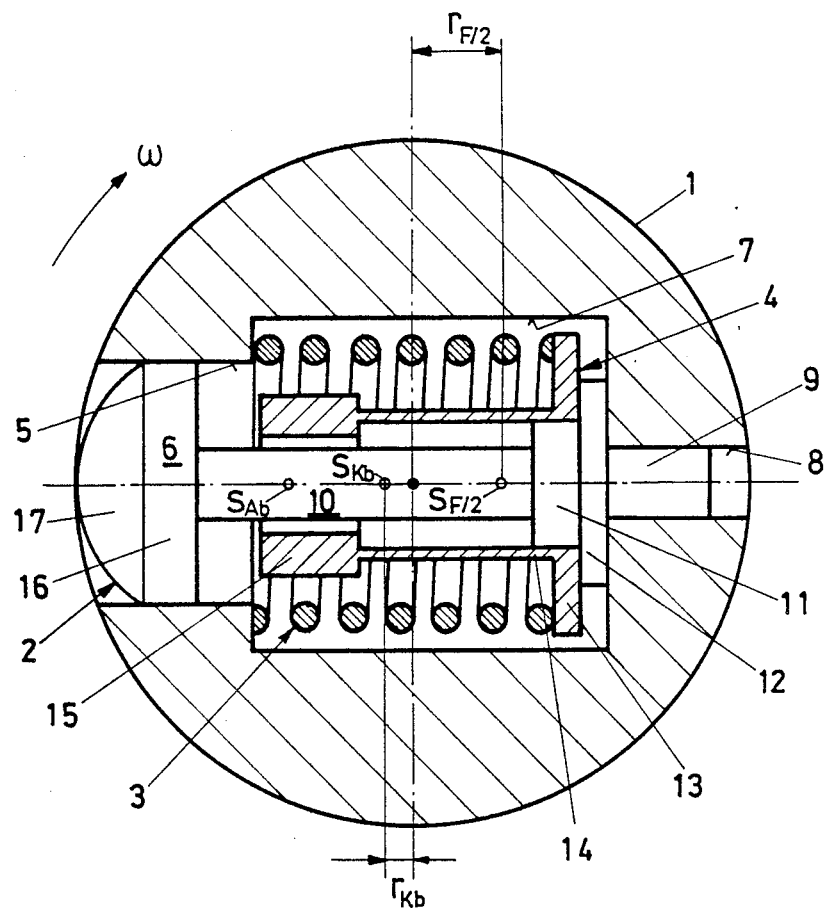

SPRING-LOADED CENTRIFUGAL SWITCH ELEMENT

Spring-loaded centrifugal switch element

The present invention relates to a spring-loaded centrifugal switch element with a release bolt having coaxially relative to one another a release head, a shank, a collar serving as a spring support, and a guide pin, the release bolt being mounted displaceably, by means of its release head and the guide pin, in two radial guides of a shaft and being loaded radially inwards by a helical spring clamped between a bearing surface integral with the shaft and the collar of the spring support of the release bolt.

STATE OF THE ART

Switch elements of this type are found, for example, in speed monitors of gas and steam turbines, the function of which is to throttle or cut off the supply of fuel or steam when the permissible operating speed is exceeded to a predetermined degree, in order to return the speed to the permissible value or stop the machine completely. When the predetermined speed is reached, the release bolt is pushed out of the limitation of the shaft as a result of centrifugal force counter to the resistance of a prestressed helical spring and thereby actuates a pawl acting on a control unit which, as mentioned, consequently throttles or shuts off the supply of fuel to the combustion chamber or the supply of steam.

During the rotation of the speed-monitor shaft, an equal and opposite centrifugal force exerted radially outwards acts on the two spring halves of equal length on opposite sides of the shaft axis. One end of the spring is supported on a bearing surface integral with the shaft, whilst the other is supported on a spring plate which is connected rigidly to the release bolt and which, in the state of rest and until the speed has been reached at which the centrifugal force on the release bolt outweighs the spring force, is likewise supported on a bearing surface integral with the shaft. As soon as that speed is reached, the spring plate lifts off from its bearing surface integral with the shaft, and the spring end there is pulled radially inwards together with it. The release bolt now comes out of the limitation of the speed-monitor shaft and actuates the pawl, by means of which a control action or the stopping of the machine is then triggered as a further consequence.

Ideally, the prestressing force of the spring should remain constant until the release speed is reached. If the spring characteristic is known, the necessary prestressing force can be set with sufficient accuracy at the time of installation by means of the known associated compression of the spring. However, in the known design, when the speed-monitor shaft rotates this prestressing force is increased as a result of the speed-dependent centrifugal force of the spring. So that the prestressing force necessary for a specific release speed can therefore actually be maintained at this speed, in the state of rest it must be less by the same amount as the contribution made to it by the spring as a result of its centrifugal force at the release speed.

The disadvantage of this known device is that this proportion of the centrifugal force of the spring has to be redetermined for every adjustment to another release speed, in order to obtain the prestressing force at rest necessary for this new release speed.

OBJECT OF THE INVENTION

The present invention arose from the object of finding means for eliminating the influence of the centrifugal force of the spring, variable with the speed, on the prestressing force of the spring. In such a switch element, the prestressing force at rest remains constant over the entire speed range and of the magnitude necessary for the release operation, and the centrifugal force of the spring does not have to be taken into account in a resetting to another release value.

The spring-loaded centrifugal switch element according to the invention is defined by a compensating bush surrounding the release bolt coaxially, with a compensating ring located on the same side as the release head in relation to the axis of the shaft, with a spring plate located on the opposite side of the shaft and supported on the collar, and with a hub tube connecting the compensating ring to the spring plate, the center of gravity of the compensating bush being on the same side as the release head, and the helical spring being clamped between the spring plate and the said bearing surface integral with the shaft and being arranged half on one side of the shaft axis and half on the other.

In an advantageous embodiment of the switch element, there are means for adjusting the spring prestressing force, for example a screwable spring plate or disks which are inserted between the spring plate and the collar serving to support it.

The FIGURE shows a cross-section through the shaft of a speed monitor at the height of the axis of the release bolt.

DESCRIPTION OF THE EXEMPLARY EMBODIMENT

In the shaft 1 there is a diametral stepped bore which receives the release bolt 2, a helical spring 3 and a compensating bush 4. The stepped bore is composed of a guide 5 for the release head 6 of the release bolt 2, of a spring space 7 and of a guide 8 for a guide pin 9 of the release bolt 2. The latter also has a shank 10, a centering extension 11 and a collar 12, the centering extension 11 serving for fixing the compensating bush 4 coaxially relative to the axis of the release bolt 2, and the collar 12 serving as a support for a spring plate 13 of the compensating bush 4.

If, in the design described hitherto, the compensating bush 4 is imagined as being omitted and the diameter of the collar 11 increased to such an extent that it can function as a spring plate for the spring 3, this device corresponds to the known design which was described in the introduction and the disadvantages of which are to be eliminated as a result of the present invention.

The compensating bush 4 accordingly embodies the inventive feature of the new switch element. The spring plate 13 of the compensating bush 4 is connected, via a thin-walled hub tube 14, to a compensating ring 15, the function of which is to keep in equilibrium the centrifugal force acting on the right-hand half of the spring when the shaft 1 rotates, since otherwise, as mentioned, this would increase the prestressing force of the spring 3 set to the overspeed in the state of rest, and the release bolt 2 would come out of its guide in order to throttle or cut off the machine to be monitored, only at an overspeed higher than that to be prevented by the speed monitor.

To ensure compensation of the centrifugal force of the spring, the condition of equilibrium $m_{Kb}r_{Kb}^2 = m_{F/2}r_{F/2}\omega^2$ must be satisfied, that is to say, in simplified form, $m_{Kb}r_{Kb} = m_{F/2}$, in which $m_{Kb}$ and $r_{Kb}$ respectively represent the mass of the compensating bush 4 and the distance between its center of gravity $S_{Kb}$ and the axis of rotation of the shaft 1, $m_{F/2}r$ and $r_{F/2}$ respectively represent the mass of the right-hand spring half and the distance between its center of gravity $S_{F/2}$ and the axis of rotation, and $\omega$ represents the angular velocity of the shaft 1. The simplified condition of equilibrium shows that the equilibrium between the mass of the right-hand spring half and the compensating bush 4 is independent of the angular velocity $\omega$, that is to say applies to the entire speed range.

Until the release speed is reached, the spring 3 presses the collar 12 of the release bolt 2 against the rear wall of the spring space 7. Till then, the centrifugal force of the compensating bush 4 keeps the centrifugal force exerted on the right-hand spring half in equilibrium, so that, in addition to the centrifugal force, only the spring prestressing force, dependent on the compression of the spring 3, acts on the release bolt 2. At the release speed, the spring is compressed by the release bolt and the centers of gravity $S_{Kp}$ and $S_{F/2}$ of the compensating bush 4 and of the right-hand spring half respectively travel to the left in the same direction as the center of gravity $S_{Ab}$ of the release bolt 2. At the same time, the relative distance $r_{Kb}$ of the center of gravity of the compensating bush 4 and therefore its centrifugal force become greater and the relative distance $r_{F/2}$ of the center of gravity of the right-hand spring half and its centrifugal force become correspondingly smaller, so that, after the release speed has been reached, the resulting excess centrifugal force of the compensating bush 4 assists the force exerted on the release bolt 2. The compensating bush 4 thus has two advantageous effects, in that, first, it cancels the centrifugal force of the spring below the release speed and thereby eliminates its falsifying influence on the release speed and, second, after the release speed has been reached it assists the pushing of the release bolt 2 with its guide part 16 and the hemispherical head 17 out of the limitation of the speed-monitor shaft.

The FIGURE shows diagrammatically merely the principle of this switch element, without the elements necessary for installation in the shaft.

In practical embodiments, elements for changing the spring prestressing force could also be provided. For example, the spring plate 13 could be screwable on the hub tube 14, in which case a lock nut or a radial set-screw would have to be provided to secure it in position. In order to change the spring prestressing force, disks of different thicknesses or in different numbers could also be arranged between the fixed spring plate 13 and the collar 12 of the release bolt 2. Radial slots made in such disks and of a width corresponding to the diameter of the centering extension 11 would make it possible to push such disks in laterally between the spring plate 13 and the collar 12.

We claim:

1. A spring-loaded centrifugal switch element, with a release bolt (2) having coaxially relative to one another a release head (6), a shank (10), a collar (12) serving as a spring support, and a guide pin (9), the release bolt (2) being mounted displaceably by means of its release head (6) and the guide pin (9) in two radial guides (5 and 8) of a shaft (1) and being loaded radially inwards by a helical spring (3) clamped between a bearing surface integral with the shaft and the collar (12) of the spring support of the release bolt (2), wherein there is a compensating bush (4) surrounding the release bolt (2) coaxially, wit a compensating ring (15) located on the same side as the release head (6) in relation to the axis of the shaft (1), with a spring plate (13) located on the opposite side of the shaft (1) and supported on the collar (12), and with a hub tube (14) connecting the compensating ring (15) to the spring plate (13), the center of gravity ($S_{Kb}$) of the compensating bush (4) being on the same side as the release head (6), and the helical spring (3) being clamped between the spring plate (13) and the said bearing surface integral with the shaft and being arranged half on one side of the shaft axis and half on the other.

2. A switch element as claimed in claim 1, wherein the release bolt (2) has a centering extension (1) for guiding the spring plate (13) of the compensating bush (4).

3. A switch element as claimed in claim 1, wherein there is a spring plate screwable on the hub tube (14) and intended for setting the prestressing force of the helical spring (3).

* * * * *